US011996650B2

(12) United States Patent
Hughes et al.

(10) Patent No.: US 11,996,650 B2
(45) Date of Patent: May 28, 2024

(54) LOADBREAK ASSEMBLY

(71) Applicant: Hubbell Incorporated, Shelton, CT (US)

(72) Inventors: David Charles Hughes, Aiken, SC (US); Bastiaan Hubertus van Besouw, Wadsworth, OH (US)

(73) Assignee: Hubbell Incorporated, Shelton, CT (US)

( * ) Notice: Subject to any disclaimer, the term of this patent is extended or adjusted under 35 U.S.C. 154(b) by 0 days.

(21) Appl. No.: 17/557,727

(22) Filed: Dec. 21, 2021

(65) Prior Publication Data

US 2022/0200194 A1 Jun. 23, 2022

Related U.S. Application Data

(60) Provisional application No. 63/128,543, filed on Dec. 21, 2020.

(51) Int. Cl.
*H01R 13/53* (2006.01)
*H01R 31/00* (2006.01)

(52) U.S. Cl.
CPC ............ *H01R 13/53* (2013.01); *H01R 31/00* (2013.01)

(58) Field of Classification Search
CPC ................................ H01R 13/53; H01R 13/00
USPC ......................... 439/181–187, 886, 887, 921
See application file for complete search history.

(56) References Cited

U.S. PATENT DOCUMENTS

| | | | | |
|---|---|---|---|---|
| 5,277,605 | A | 1/1994 | Roscizewski et al. | |
| 5,445,533 | A * | 8/1995 | Roscizewski .......... | H01R 13/53 439/184 |
| 5,525,069 | A * | 6/1996 | Roscizewski .......... | H01R 13/53 439/184 |
| 7,258,585 | B2 | 8/2007 | Hughes et al. | |
| 7,862,354 | B2 | 1/2011 | Hughes et al. | |
| 2007/0026713 | A1 * | 2/2007 | Hughes .................. | H01R 13/53 439/181 |
| 2007/0032110 | A1 | 2/2007 | Hughes et al. | |
| 2009/0215313 | A1 | 8/2009 | Hughes | |
| 2011/0034051 | A1 | 2/2011 | Kumar et al. | |

(Continued)

OTHER PUBLICATIONS

Hubbell Incorporated, Cable Accessories, Experience & Reliability, Catalog C7, Copyright 2017 (73 pages).

(Continued)

*Primary Examiner* — Gary F Paumen
(74) *Attorney, Agent, or Firm* — Michael Best & Friedrich LLP

(57) ABSTRACT

A loadbreak bushing including a housing with a bore extending along the longitudinal axis from a first end of the housing toward a second end of the housing. The bore has a first end positioned at or adjacent the first end of the housing and a second end opposite the first end of the bore. A first electrical contact is positioned within the bore adjacent the second end and is configured to be in electrical communication with an electrical component. The first electrical contact is configured to be physically and electrically coupled to a second electrical contact of a power connection. An arc quenching member is positioned within the bore between the first end of the bore and the first electrical contact. A resistive member is coupled to either the first electrical contact or the arc quenching member.

17 Claims, 8 Drawing Sheets

(56) References Cited

U.S. PATENT DOCUMENTS

| | | | | |
|---|---|---|---|---|
| 2014/0193991 | A1 | 7/2014 | York et al. | |
| 2020/0006879 | A1 * | 1/2020 | Szyszko ................. | H01R 13/03 |

OTHER PUBLICATIONS

PCT/US2021/064585 International Search Report and Written Opinion dated Mar. 8, 2022.

* cited by examiner

LOADBREAK ASSEMBLY

CROSS-REFERENCE TO RELATED APPLICATIONS

The present application is a non-provisional of and claims benefit of U.S. Provisional Patent Application No. 63/128,543, filed on Dec. 21, 2020, the entire contents of which are incorporated herein by reference.

FIELD

The present application relates to a loadbreak assembly for a high-voltage electrical system and includes a loadbreak bushing and a loadbreak connector that is physically and electrically coupleable to the load bushing.

SUMMARY

In one embodiment, a loadbreak bushing includes a housing with a first end, a second end opposite the first end, a longitudinal axis extending between the first end of the housing and the second end of the housing, and a bore extending along the longitudinal axis from the first end of the housing toward the second end of the housing. The bore has a first end positioned at or adjacent the first end of the housing and a second end opposite the first end of the bore. A first electrical contact is positioned within the bore adjacent the second end and is configured to be in electrical communication with an electrical component. The first electrical contact is configured to be physically and electrically coupled to a second electrical contact of a power connection. An arc quenching member is positioned within the bore between the first end of the bore and the first electrical contact. The arc quenching member includes a hollow body. A resistive member is coupled to either the first electrical contact or the arc quenching member.

In another embodiment, a loadbreak bushing includes a housing with a first end, a second end opposite the first end, a longitudinal axis extending between the first end of the housing and the second end of the housing, and a bore extending along the longitudinal axis from the first end of the housing toward the second end of the housing. The bore has a first end positioned at or adjacent the first end of the housing and a second end opposite the first end of the bore. A first electrical contact is positioned within the bore, and includes a base positioned adjacent the second end and a plurality of fingers extending from the base towards the first end. The base is configured to be in electrical communication with an electrical component. The plurality of fingers is configured to receive and electrically couple to a second electrical contact of a power connection. An arc quenching member is positioned within the bore between the first end of the bore and the plurality of fingers of the first electrical contact. The arc quenching member includes a hollow body. A resistive member is coupled to either the first electrical contact or the arc quenching member.

In another embodiment, a loadbreak bushing includes a housing with a first end, a second end opposite the first end, a longitudinal axis extending between the first end of the housing and the second end of the housing, and a bore extending along the longitudinal axis from the first end of the housing toward the second end of the housing. The bore has a first end positioned at or adjacent the first end of the housing and a second end opposite the first end of the bore. A first electrical contact is positioned within the bore adjacent the second end and configured to be in electrical communication with an electrical component. The first electrical contact is configured to be physically and electrically coupled to a second electrical contact of a power connection to complete an electrical circuit. An arc quenching member is positioned within the bore between the first end of the bore and the first electrical contact. The arc quenching member including a hollow body. A resistive member is coupled to either the first electrical contact or the arc quenching member. The resistive member is excluded from circuit while the second electrical contact is physically and electrically coupled to the first electrical contact, and the resistive member bridges the second electrical contact and the first electrical contact when the second electrical contact is physically and electrically decoupled from the first electrical contact thereby adding resistance to the circuit and lowering the current.

In another embodiment, a loadbreak bushing includes a housing with a first end, a second end opposite the first end, a longitudinal axis extending between the first end of the housing and the second end of the housing, and a bore extending along the longitudinal axis from the first end of the housing toward the second end of the housing. The bore has a first end positioned at or adjacent the first end of the housing and a second end opposite the first end of the bore. A first electrical contact is positioned within the bore adjacent the second end and is configured to be in electrical communication with an electrical component. The first electrical contact is configured to be physically and electrically coupled to a second electrical contact of a power connection. An arc quenching member is positioned within the bore between the first end of the bore and the first electrical contact. The arc quenching member includes a hollow body. A resistive member is coupled to the first electrical contact. When arcing occurs, it occurs between the resistive member and the second electrical contact, and the resistive member reduces arcing between the first electrical contact and the second electrical contact. The resistive member prevents erosion of the first electrical contact and reduces erosion of the second electrical contact due to arcing.

In another embodiment, a loadbreak bushing includes a housing with a first end, a second end opposite the first end, a longitudinal axis extending between the first end of the housing and the second end of the housing, and a bore extending along the longitudinal axis from the first end of the housing toward the second end of the housing. The bore has a first end positioned at or adjacent the first end of the housing and a second end opposite the first end of the bore. A first electrical contact is positioned within the bore adjacent the second end and is configured to be in electrical communication with an electrical component. The first electrical contact is configured to be physically and electrically coupled to a second electrical contact of a power connection. An arc quenching member is positioned within the bore between the first end of the bore and the first electrical contact. The arc quenching member includes a hollow body. A resistive member is coupled to the arc quenching member. When arcing occurs, it occurs between the resistive member and the first electrical contact and it occurs between the resistive member and the second electrical contact, and the resistive member reduces arcing between the first electrical contact and the second electrical contact. The resistive member reduces erosion of both the first electrical contact and the second electrical contact due to arcing.

Other aspects of the application will become apparent by consideration of the detailed description and accompanying drawings.

DETAILED DESCRIPTION

Before any embodiments of the application are explained in detail, it is to be understood that the application, and the devices and method described herein, are not limited in their application to the details of construction and the arrangement of components set forth in the following description or illustrated in the following drawings. The devices and methods in this application are capable of other embodiments and of being practiced or of being carried out in various ways.

Figure 1:
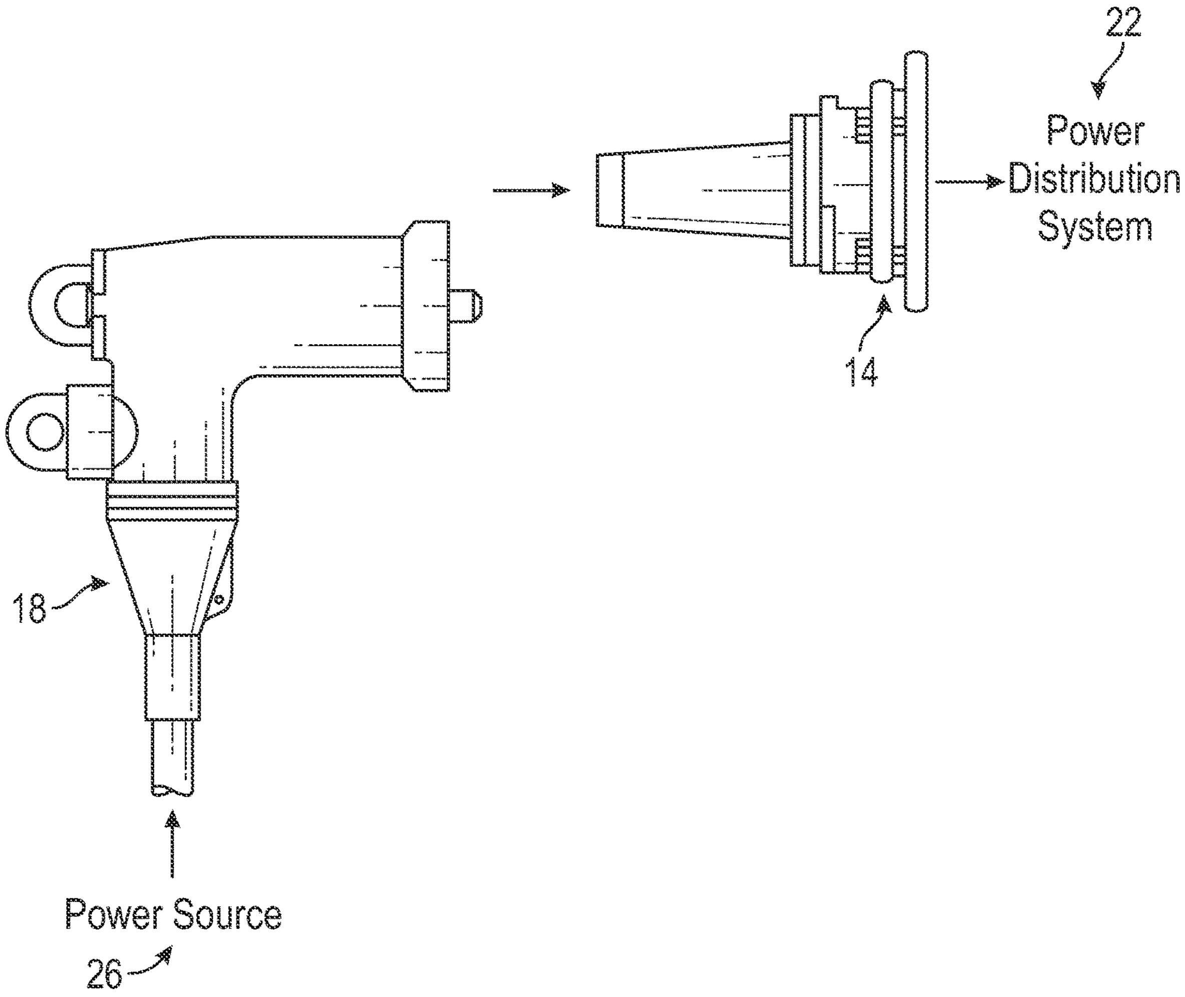
FIG. 1 illustrates a loadbreak assembly including a loadbreak connector configured to couple to a loadbreak bushing.

FIG. 1 illustrates a loadbreak assembly 10 including a loadbreak bushing 14 that is physically and electrically coupleable to a loadbreak connector 18. The loadbreak bushing 14 is configured to be in electrical communication with an electrical component of a power distribution system 22, such as a switchgear, transformer, or sectionalizing equipment. The loadbreak connector 18 is configured to be in electrical communication with a power source or power load 26 (e.g., power connection), such as a high-voltage electrical system facility (e.g., a substation or the like). When physically and electrically coupled, the loadbreak connector 18 is configured to deliver or receive high-voltage power from the power connection 26 to or from the distribution system 22 via the loadbreak bushing 14.

Figure 2:
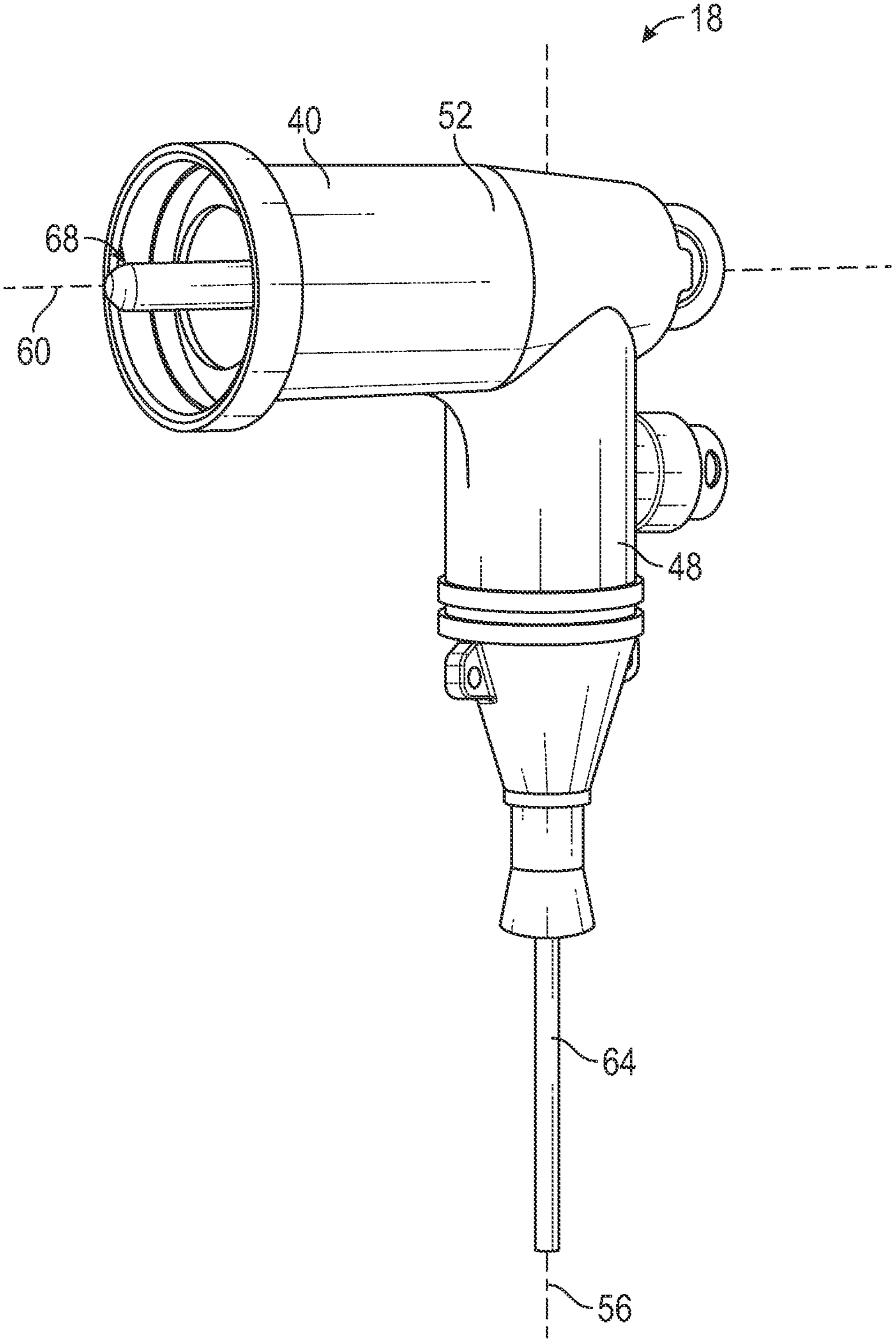
FIG. 2 illustrates the loadbreak connector of FIG. 1.
Figure 3:
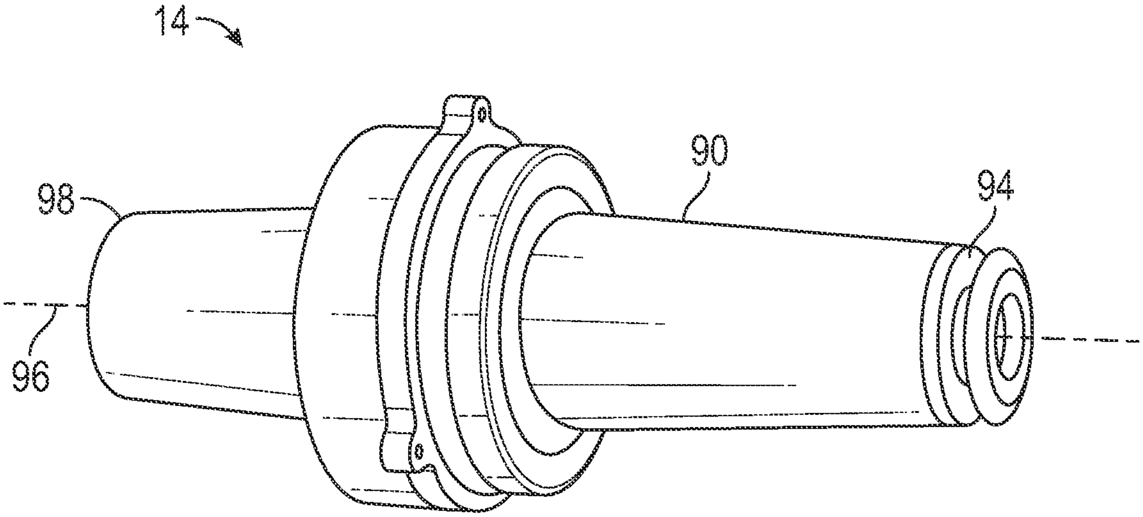
FIG. 3 illustrates the loadbreak bushing of FIG. 1.

With respect to FIGS. 1, 2, 4, 5, the loadbreak connector 18 includes a housing 40 that couples the power connection 26 to an electrical contact 44 (FIGS. 4 and 5), which is also called a probe. The electrical contact 44 may be constructed from any suitable conductive material. In the illustrated embodiment, the housing 40 is an L-shaped housing including a first portion 48 that has a first aperture (not shown) and a second portion 52 that has a second aperture (not shown). The first aperture extends along a first axis 56 and the second aperture extends along a second axis 60. The first and second apertures are in communication with one another and the first and second axes 56, 60 intersect at a substantially perpendicular angle. The first aperture receives and secures a cable 64 that is in electrical communication with the power connection 26. The cable 64 has a first coupling member (not shown) on end thereof. The second aperture receives and retains the electrical contact 44. The electrical contact 44 includes a second coupling member (not shown) on a first end and an arc follower 68 that is coupled to and extends from a second end. The first and second coupling members physically and electrically couple to one another such that the power connection 26 is in electrical communication with the electrical contact 44. The arc follower 68 extends from the housing 40, as shown in FIG. 2. In other or additional embodiments, the housing 40 may have other suitable configurations to accommodate the cable 64 and the electrical contact 44.

Figure 12:
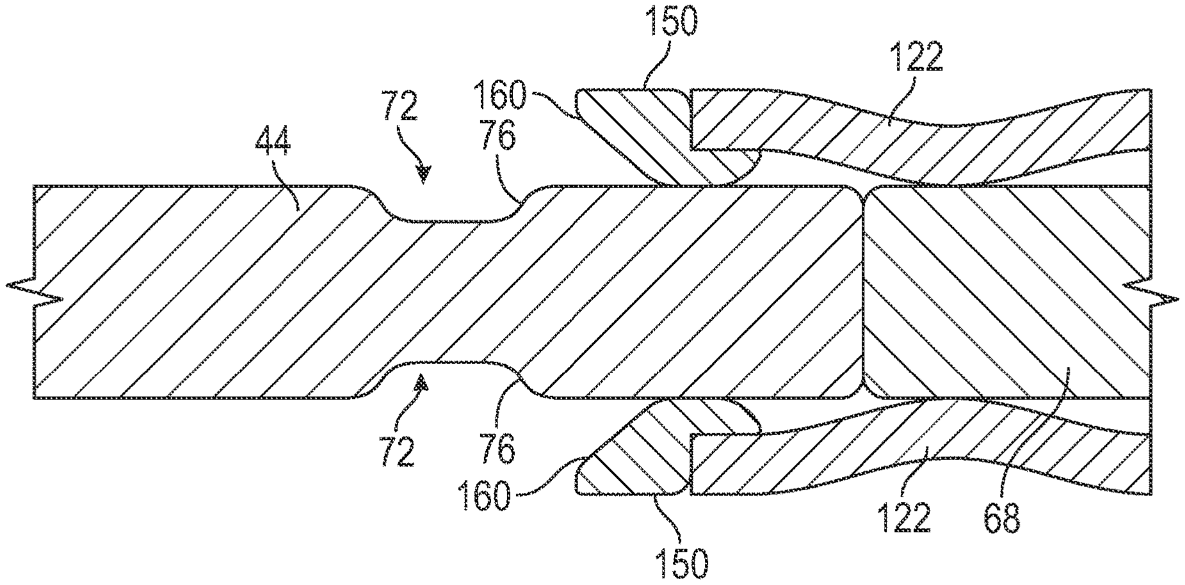
FIG. 12 illustrates a schematic view of an electrical contact of another loadbreak connector positioned relative to an electrical contact of the loadbreak bushing in the first state, the electrical contact having a resistive member.
Figure 13:
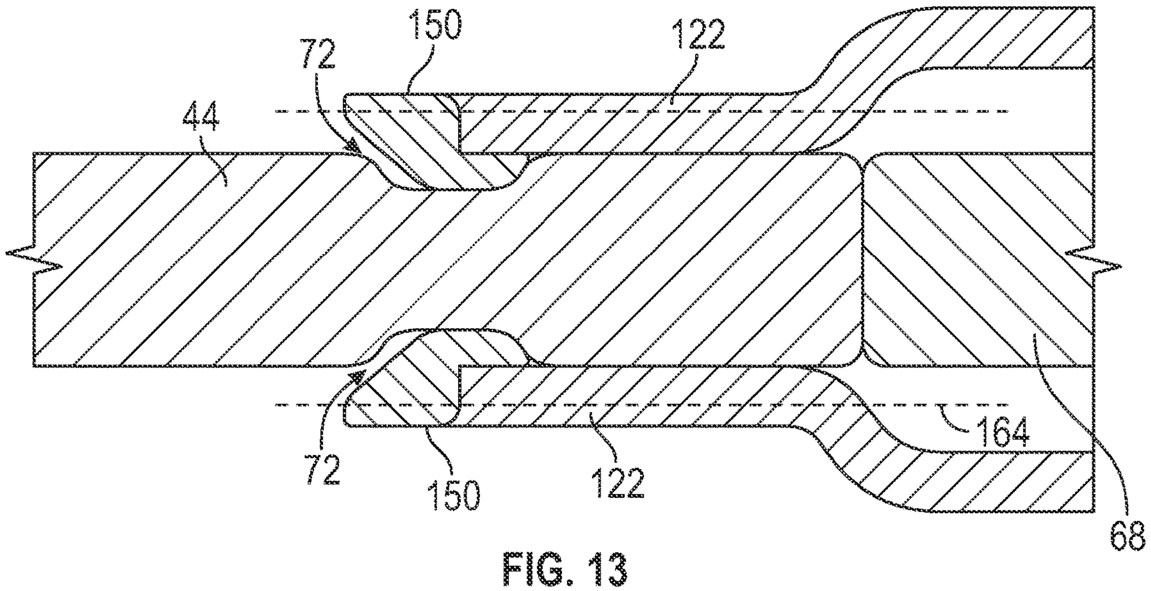
FIG. 13 illustrates a schematic view of the electrical contact of FIG. 12 positioned relative to the electrical contact of FIG. 21 in the second state.

In some embodiments, the electrical contact 44 has a substantially uniform outer dimension. That is, with respect to FIGS. 4-5, the electrical contact 44 is cylindrical and has a uniform outer diameter. In some embodiments, the electrical contact 44 has a variable outer dimension. For example, as shown in FIGS. 12-13, the electrical contact 44 is substantially cylindrical and has one or more recesses 72 defined in the outer diameter. The recesses 72 are positioned between the second coupling member and the arc follower 68 and each includes a ramped surface 76.

As shown in FIGS. 1, 3, and 4-6, the loadbreak bushing 14 includes a housing 90 that has a first end 94, a second end 98 opposite the first end 94, a longitudinal axis 96 extending between the first end 94 and the second end 98, and a bore 102 (FIGS. 5 and 6) extending along the longitudinal axis 96 from the first end 94 toward the second end 98. The bore 102 has a first end 106 positioned at or adjacent the first end 94 of the housing 80 and a second end 110 positioned opposite the first end 106.

Figure 4:
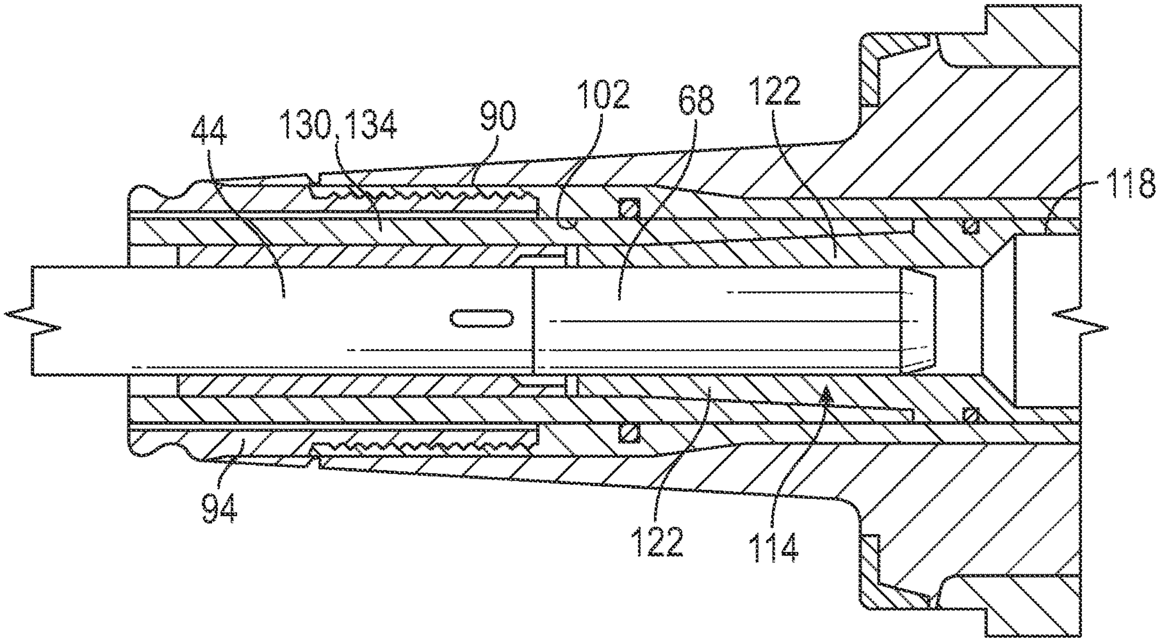
FIG. 4 illustrates the loadbreak connector of FIG. 1. positioned relative the loadbreak bushing of FIG. 1 in a first state.
Figure 5:
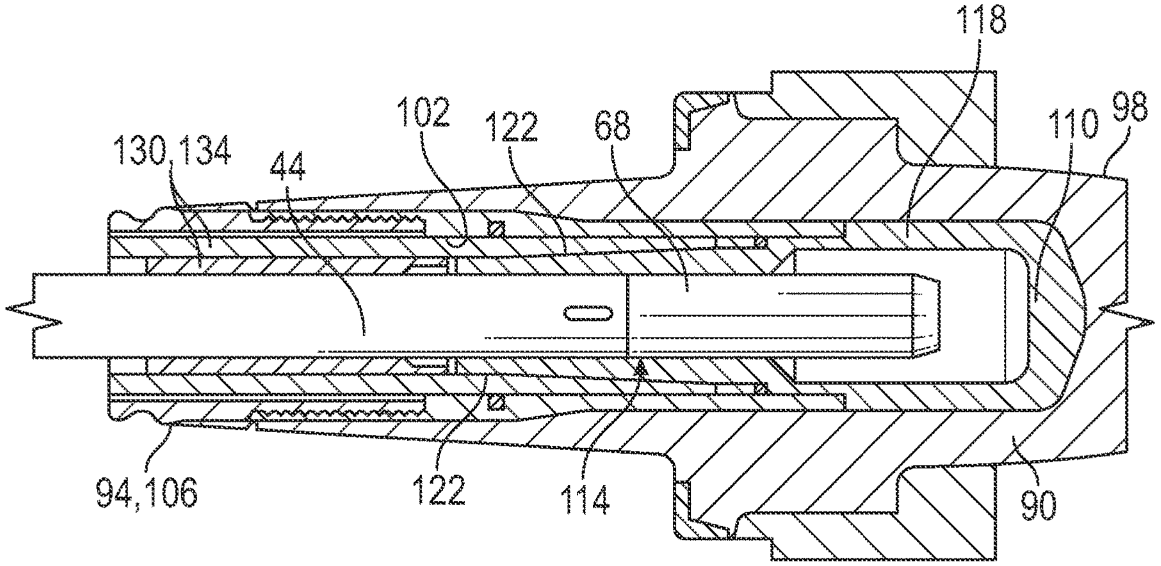
FIG. 5 illustrates the loadbreak connector of FIG. 1. positioned relative the loadbreak bushing of FIG. 1 in a second state.
Figure 6:
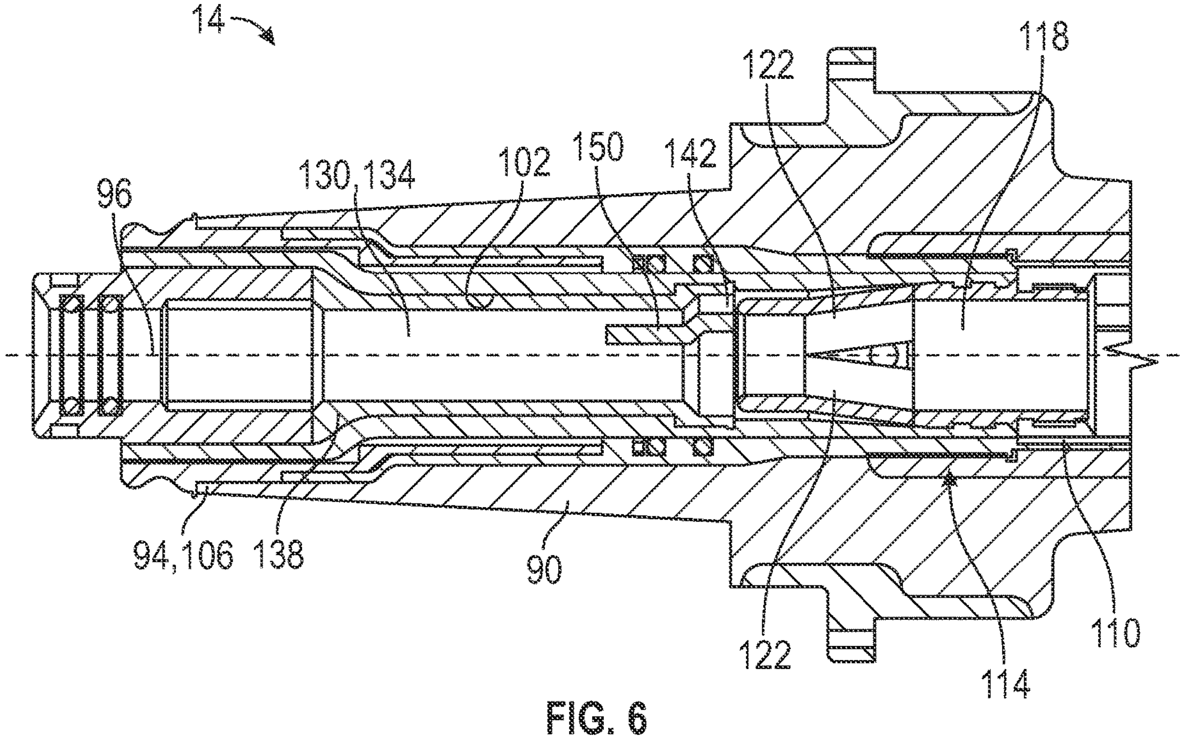
FIG. 6 illustrates the loadbreak bushing of FIG. 1 with a portion of the housing removed and having a resistive member according to one embodiment.

An electrical contact 114 is positioned within the bore 102 adjacent the second end 110. The electrical contact 114 is configured to be in electrical communication with the electrical component of the power distribution system 22. In the illustrated embodiment, the electrical contact 114 includes a base 118 positioned adjacent the second end 110 and a plurality of fingers 122 extending from the base 118 towards the first end 106. The base 106 is physically and electrically coupleable (e.g., via a stud, not shown, extending therefrom) to the electrical component. Each of the plurality of fingers 122 is a spring-like member that is movable. Together the plurality of fingers 122 is movable between a first position (FIG. 6) in which ends thereof are positioned adjacent one another and a second position (FIGS. 4-5) in which the ends thereof are spaced apart from one another. In the embodiment of FIGS. 4-6, each of the plurality of fingers 122 has the same length. In other embodiments, such as that of FIG. 11, one or more of the plurality of fingers 122 may have a first length and one or more of the plurality of fingers 122 may have a second length that is shorter than the first length. The electrical contact 114 is formed from any suitable conductive material or combinations of conductive materials.

Further with respect to FIGS. 4-5, an arc quenching member 130 (e.g., an arc snuffer) is positioned within the bore 102 between the first end 94 and the electrical contact 114. In the illustrated embodiment, the arc quenching member 130 includes a hollow body 134 having a first end 138 and a second end 142. In the illustrated embodiment, the hollow body 134 is substantially cylindrical and concentric with the bore 102 of the housing. Further, the first end 138 is positioned at or adjacent first end 106 of the bore 102 and the second end 142 is positioned adjacent the electrical contact 114. In particular, as shown throughout, the second end 114 is positioned adjacent the ends of the plurality of fingers 114. The arc quenching member 130 is formed from acetal melamine, for example.

Figure 7:
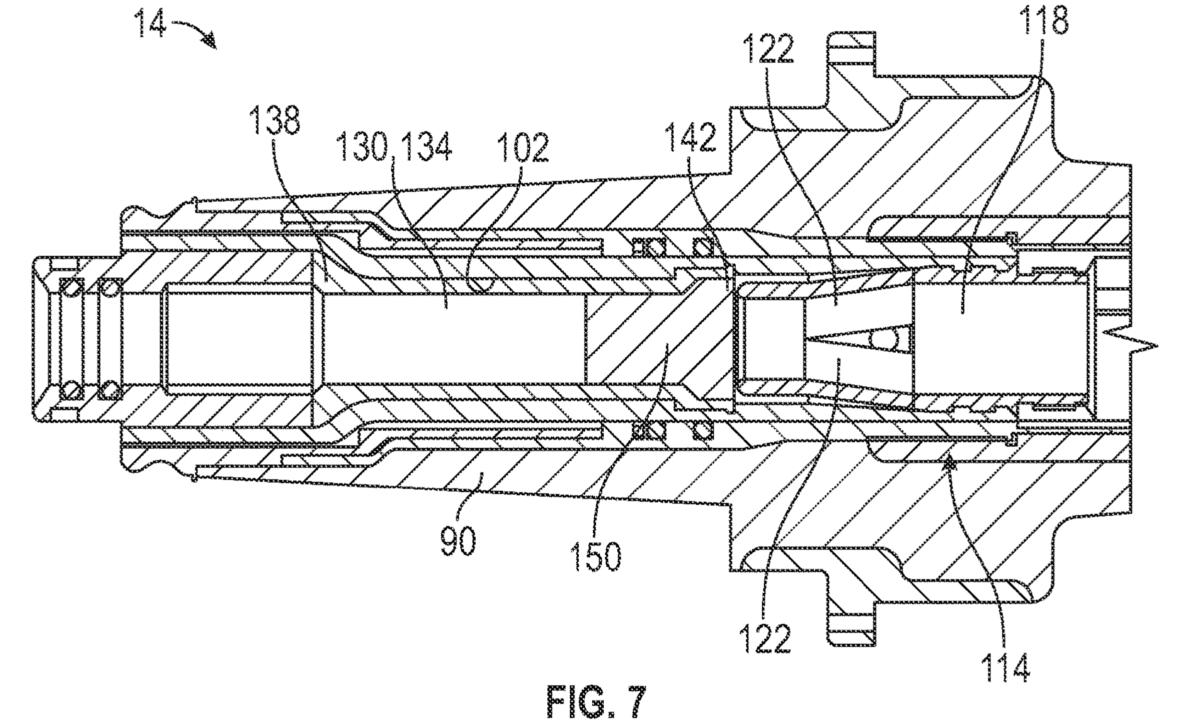
FIG. 7 illustrates the loadbreak bushing of FIG. 1 with a portion of the housing removed and having a resistive member according to another embodiment.
Figure 8:
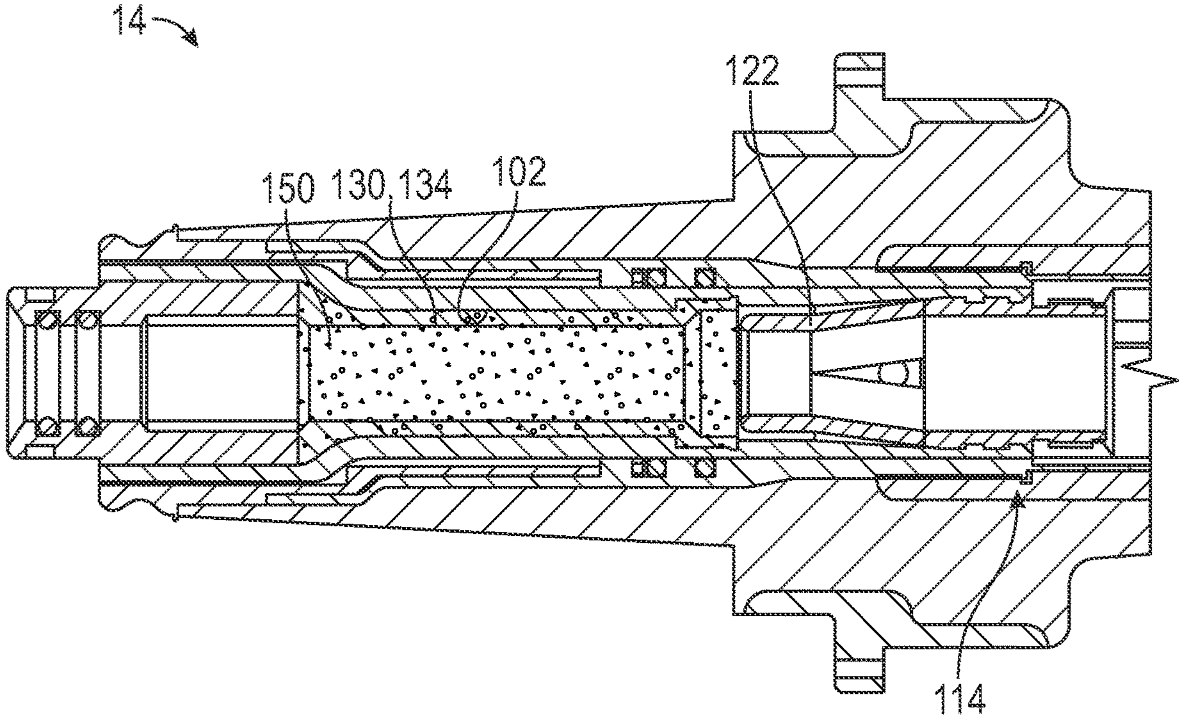
FIG. 8 illustrates the loadbreak bushing of FIG. 1 with a portion of the housing removed and having a resistive member according to another embodiment.

With respect to FIGS. 6-13, the loadbreak bushing 14 includes a resistive member 150 that is coupled to either the electrical contact 114 (FIG. 9-13) or the arc quenching member 130 (FIGS. 6-8). The resistive member 150 may be formed from an electrically conductive material. That is, preferably the resistive member 150 is both electrically-resistant and arc-resistant. In particular, the resistive member 150 may be formed from one or more of the following materials: tungsten, molybdenum, silicon carbide, metal oxide varistor or other ceramic, a metal alloy (e.g., tungsten-copper), a conductive elastomer, or a high dielectric constant polymer.

With respect to FIGS. 6-8, the resistive member 150 is coupled to the arc quenching member 130. In the illustrated embodiments of FIGS. 6-8, the resistive member 150 is embedded in the material that forms the arc quenching member 130. In other embodiments, the resistive member 150 of FIGS. 6-8 may be positioned within another substrate material and coupled to an interior or exterior surface of the arc quenching member 130.

In the embodiment of FIGS. 6 and 7, the resistive member 150 is positioned at the second end 142 of hollow body 134 and extends towards the first end 138 of the hollow body 134. In the embodiments of FIGS. 6 and 7, the resistive members 150 only extend a portion of the length of the hollow body 134 but in other embodiments, the resistive members 150 may extend along greater or lesser lengths or the entire length of the hollow body 134. In the embodiment of FIG. 6, the resistive member 150 is a single discrete resistive member 150 that extends parallel to a length of the hollow body 134 of the arch quenching member 130 and the longitudinal axis 96. In other embodiments, the discrete resistive member 150 may extend in parallel to a perimeter of the second end 142 of the hollow body 134 of the arc quenching member 130. In other embodiments, the discrete resistive member 150 may be one of a plurality of discrete resistive members 150 positioned at the second end 142 of the hollow body 134 of the arc quenching member 130. The plurality of discrete resistive members 150 may be spaced at equal or unequal intervals about the perimeter of the second end 142 of the hollow body 134 of the arc quenching member 130 and extend parallel to the length of the hollow body 134 (and therefore the longitudinal axis 96). Alternatively, the plurality of discrete resistive members 150 may be spaced at equal or unequal intervals and extend in parallel to the perimeter of the second end 138 of the hollow body 134 of the arc quenching member 130. With respect to FIG. 7, a shape of the resistive member 150 may be substantially the same as a shape of the second end 138 of the hollow body 134. In other words, the resistive member 150 may be a hollow body having the same shape and configuration as the second end 142 of the hollow body of the arc quenching member 130. Accordingly, with respect to the embodiment of FIG. 7, the hollow body of the resistive member 150 is concentric with the second end 138 of the hollow body 142 of the arc quenching member 130. Alternatively, with respect to FIG. 8, the resistive member 150 is a plurality of resistive member 150 particles dispersed or otherwise embedded within the material that forms the arc quenching member 130.

Figure 9:
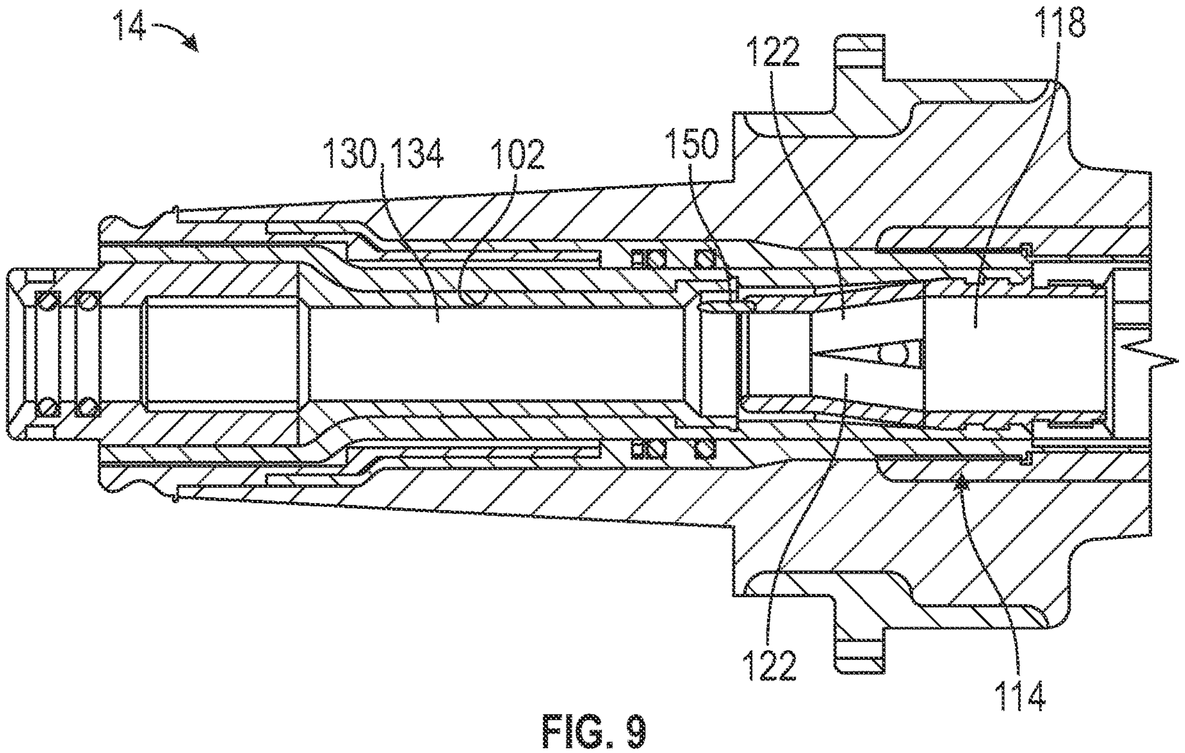
FIG. 9 illustrates the loadbreak bushing of FIG. 1 with a portion of the housing removed and having a resistive member according to another embodiment.
Figure 10:
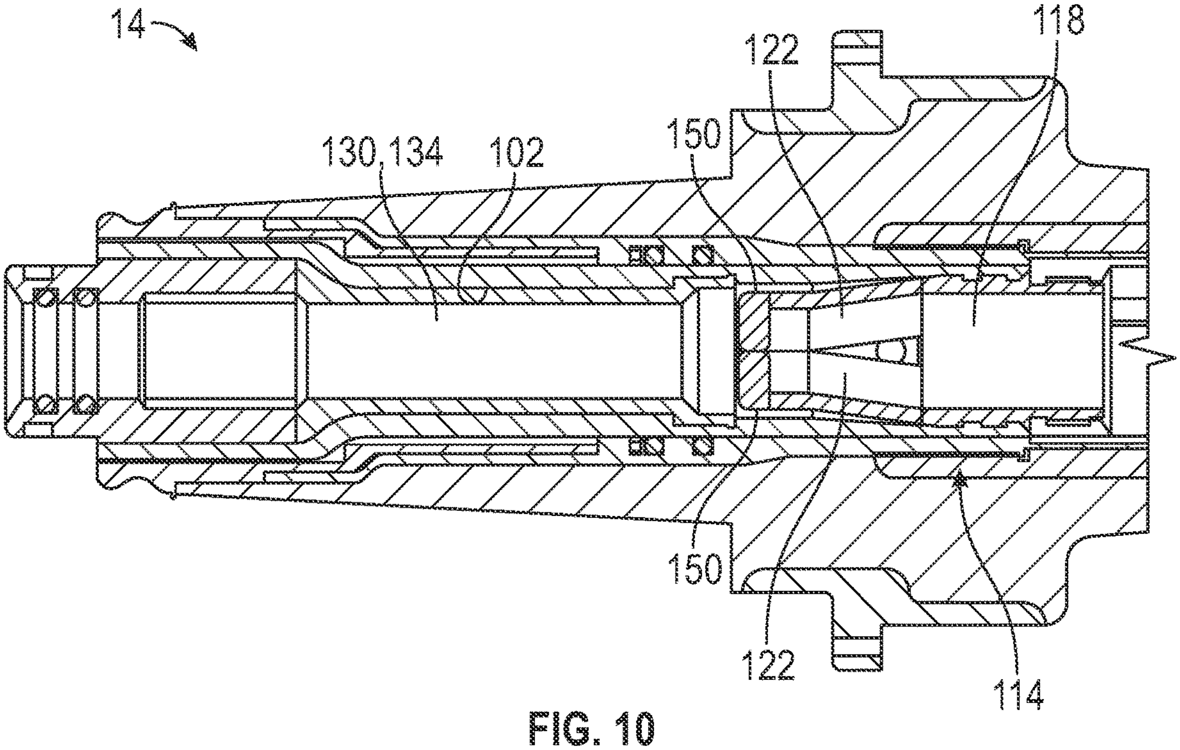
FIG. 10 illustrates the loadbreak bushing of FIG. 1 with a portion of the housing removed and having a resistive member according to another embodiment.
Figure 11:
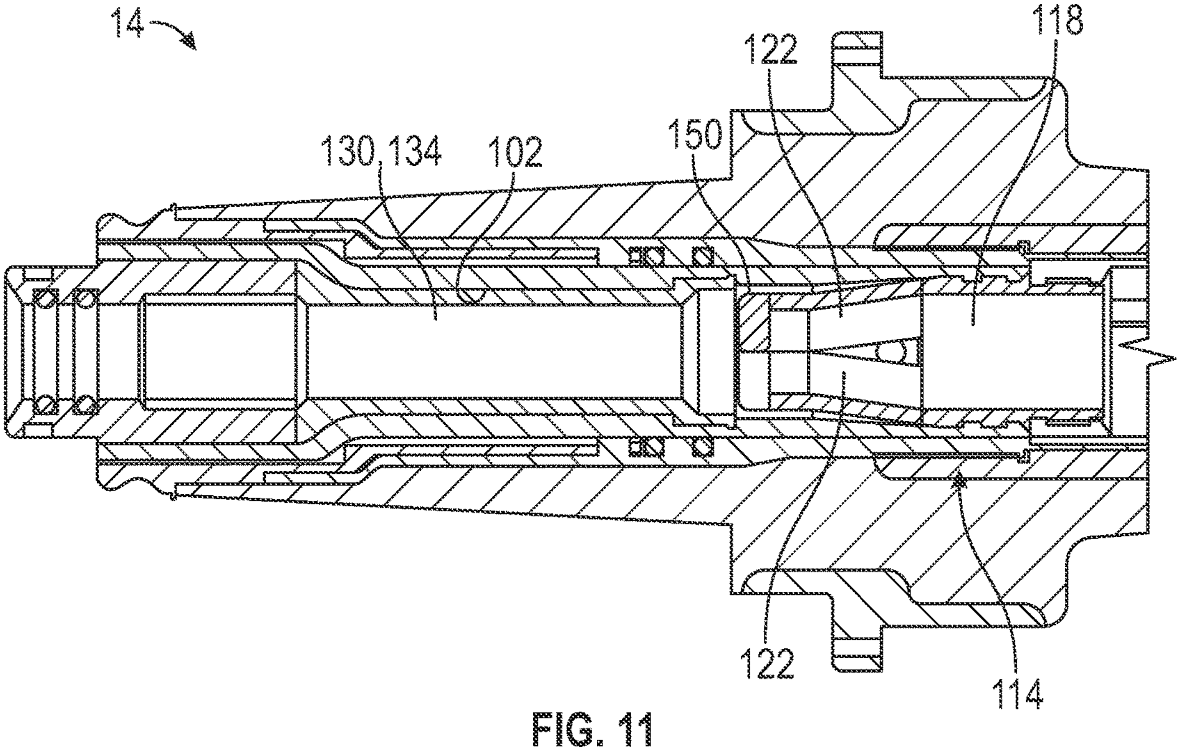
FIG. 11 illustrates the loadbreak bushing of FIG. 1 with a portion of the housing removed and having a resistive member according to another embodiment.

With respect to FIGS. 9-13, the resistive member 150 is coupled to the electrical contact 114. In the embodiments of FIGS. 9-13, the resistive member 150 is coupled to one or more of the plurality of fingers 122. In the embodiment of FIG. 9, the resistive member 150 may be a discrete resistive member 150 coupled to and extending from one or more of the plurality of fingers 122 towards the arc quenching member 130. In the embodiment of FIGS. 10 and 11, the resistive member 150 may cover or coat the ends of one or more of the plurality of fingers 122. In the embodiments of FIG. 10, each of the plurality of fingers 122 have the resistive member (e.g., a resistive coating) on the ends thereof. In the embodiment of FIG. 11, only some of the plurality of fingers 122 have a resistive coating on the ends thereof. Further with respect to the embodiment of FIG. 11, the fingers 122 with first, longer lengths have the resistive member 150, while the fingers 122 with the second, shorter lengths do not. With respect to FIGS. 12 and 13, a resistive member 150 may be coupled to one or more of the plurality of fingers 122 and define a ramped surface 160, a tangent line to which is oriented at a non-parallel angle with respect an axis 164 defined by the respective finger 122.

With renewed respect to FIGS. 4 and 5, to couple the loadbreak connector 18 to the loadbreak bushing 14, the electrical contact 44 and the arc follower 68 of the loadbreak connector 18 are guided through the first end 106 of the bore 102 and the arc quenching member 130 and into contact with the electrical contact 114 of the loadbreak bushing 14. In particular, the electrical contact 44 and the arc follower 68 of the loadbreak connector 18 are guided through the arc quenching member 130 and are received between the plurality of fingers 122 by moving the plurality of fingers from the first position to the second position. As shown in FIG. 5, the ends of the plurality of fingers 122 (and therefore the resistive members 150 when coupled to the fingers 122) extend beyond the arc follower 68 to physically contact and electrically connect the electrical contacts 44, 114. In the embodiments of FIGS. 6-8, the resistive member 150 of the arc quenching member 130 contacts the electrical contact 44 of the loadbreak connector 18. In the embodiment of FIGS. 9-13, the resistive members 150 positioned on the one or more fingers 122 contact the electrical contact 44 of the loadbreak connector 18. In fact, the resistive members 150 of FIGS. 9-13 contact the electrical contact 44 first as the loadbreak connector is being coupled to the loadbreak bushing 14. The fingers 122 may be positioned relative to the electrical contact 44 by sliding the ends of the fingers 122 (FIGS. 6-8), the resistive members 150 (FIG. 9-10), or both (FIG. 11) on the outer surface of the electrical contact 44. With respect to FIGS. 12-13, the resistive members 150 may further be received in a respective recess 72 guided by the mating ramped surfaces 76, 160 (FIGS. 12-13). Although in contact with the electrical contact 44 of the loadbreak connector 18, the resistive member 150 is excluded from circuit while the electrical contacts 44, 114 are physically and electrically coupled.

To decouple the loadbreak connector 18 from the loadbreak bushing 14, the electrical contact 44 and the arc follower 68 of the loadbreak connector 18 are removed from the electrical contact 114 of the loadbreak bushing 14. In particular, the electrical contact 44 and the arc follower 68 of the loadbreak connector 18 are removed from between the plurality of fingers 122 and are guided through the arc quenching member 130 toward the first end 106 of the bore 102. The plurality of fingers 122 then return to the first position from the second position. In the embodiments of FIGS. 6-8, the resistive member 150 of the arc quenching member 130 remains in contact with the electrical contact 44 of the loadbreak connector 18 during removal of the electrical contact 44. In the embodiment of FIGS. 9-13, the resistive members 150 of FIGS. 9-13 positioned on the one or more fingers 122 of the loadbreak bushing 14 are the last to decouple from the electrical contact 44 of the loadbreak connector 18. When the electrical contact 44 is removed, the ends of the fingers 122, the resistive members 150, or both slide on the outer surface of the electrical contact 44. With respect to FIGS. 12-13, the resistive members are removed from the respective recess 72, guided by the mating ramped surfaces 76, 160.

Together the arc follower 68, the arc quenching member 130, and the resistive member 150 reduce or mitigate arcing when the electrical contact 44 of the loadbreak connector 18 is decoupled from electrical contact 114 the loadbreak bushing 14 by unzipping the molecular energy of the molecules and deionizing the surrounding air. The resistive member 150 makes it easier to break the load between the electrical contacts 44, 114 when they are decoupled because the resistive member 150 bridges the electrical contacts 44, 114 thereby adding resistance to the circuit and lowering the current. As noted above, the resistive member 150 is both electrically-resistant and arc-resistant, and therefore the resistive member 150 may either prevent or reduce the erosion (e.g., erosion will occur at much lesser rate) of either or both of the electrical contacts 44, 114 due to arcing. In other words, the resistive member 150 may help prevent the material of either or both of the electrical contacts 44, 114 from eroding or deforming, which increases the longevity of use of the loadbreak bushing 14. For example, if the resistive member 150 is positioned on or otherwise coupled to the electrical contact 114 (e.g., one or more of the fingers 122 of the electrical contact 114), arcing will occur between the resistive member 150 and the electrical contact 44. In this case, arcing will be reduced between the electrical contacts 44, 114. Therefore, erosion of the electrical contact 114 will be prevented and erosion of the electrical contact 44 will be significantly reduced because the resistance in the circuit lowers the current. In another example, if the resistive member 150 is included as part of or is otherwise coupled to the arc quenching member 130, arcing will occur between the resistive member 150 and both the electrical contacts 44, 114. In this case, arcing will be reduced between the electrical contacts 44, 114. Therefore, erosion of both the electrical contacts 44, 114 will be significantly reduced because the resistance in the circuit lowers the current. The resistive members 150 of FIGS. 6-13 allow the loadbreak bushings to switch significantly more current than conventional loadbreak bushings. Conventional loadbreak bushings are only rated for a 200A loadbreak switching. Although conventional loadbreak bushings can carry more current, they only reliably switch 200A. By adding the resistive members 150 of FIGS. 6-13 the loadbreak bushing cancan have an increased current rating of between 20% and 100%.

Thus, the application provides, among other things, a testing circuit for use in accordance with a dead front connector. Various features and advantages of the application are set forth in the following claims.

What is claimed is:

1. A loadbreak bushing comprising:

a housing including a first end, a second end opposite the first end, a longitudinal axis extending between the first end of the housing and the second end of the housing, and a bore extending along the longitudinal axis from the first end of the housing toward the second end of the housing, the bore having a first end positioned at or adjacent the first end of the housing and a second end opposite the first end of the bore;

a first electrical contact positioned within the bore adjacent the second end and configured to be in electrical communication with an electrical component, the first electrical contact configured to be physically and electrically coupled to a second electrical contact of a power connection;

an arc quenching member positioned within the bore between the first end of the bore and the first electrical contact, the arc quenching member including a hollow body; and a resistive member coupled to the arc quenching member, wherein the resistive member is embedded in the arc quenching member.

2. The loadbreak bushing of claim 1, wherein the resistive member is formed from one or more of tungsten, molybdenum, silicon carbide, metal oxide varistor, a ceramic, a conductive elastomer, high dielectric constant polymer, or an alloy.

3. The loadbreak bushing of claim 1, wherein the hollow body of the arc quenching member has a first end positioned adjacent the first end of the housing and a second end opposite the first end of the hollow body and positioned adjacent the first electrical contact, the resistive member being embedded in the second end of the hollow body.

4. The loadbreak bushing of claim 3, wherein the resistive member includes one or more resistive members that extend from the second end of the hollow body of the arc quenching member towards the first end of the hollow body of the arc quenching member.

5. The loadbreak bushing of claim 3, wherein a shape of the resistive member is substantially the same as a shape of the second end of the hollow body.

6. The loadbreak bushing of claim 3, wherein the resistive member defines a hollow body that is concentric with the second end of the hollow body of the arc quenching member.

7. A loadbreak bushing comprising:

a housing including a first end, a second end opposite the first end, a longitudinal axis extending between the first end of the housing and the second end of the housing, and a bore extending along the longitudinal axis from the first end of the housing toward the second end of the housing, the bore having a first end positioned at or adjacent the first end of the housing and a second end opposite the first end of the bore;

a first electrical contact positioned within the bore and including a base positioned adjacent the second end and a plurality of fingers extending from the base towards the first end, the base configured to be in electrical communication with an electrical component, the plurality of fingers configured to receive and electrically couple to a second electrical contact of a power connection;

an arc quenching member positioned within the bore between the first end of the bore and the plurality of fingers of the first electrical contact, the arc quenching member including a hollow body; and a resistive member coupled to the arc quenching member wherein the resistive member is embedded in the arc quenching member.

8. The loadbreak bushing of claim 7, wherein the resistive member is formed from one or more of tungsten, molybdenum, silicon carbide, metal oxide varistor, a ceramic, a conductive elastomer, high dielectric constant polymer, or an alloy.

9. The loadbreak bushing of claim 7, wherein the hollow body of the arc quenching member has a first end positioned adjacent the first end of the housing and a second end opposite the first end of the hollow body and positioned adjacent the plurality of fingers of the first electrical contact, the resistive member being embedded in the second end of the hollow body.

10. The loadbreak bushing of claim 9, wherein the resistive member includes one or more resistive members that extends from the second end of the hollow body of the arc quenching member towards the first end of the hollow body of the arc quenching member.

11. The loadbreak bushing of claim 10, wherein a shape of the resistive member is substantially the same as a shape of the second end of the hollow body.

12. The loadbreak bushing of claim 7, wherein the resistive member is formed from one or more of tungsten, molybdenum, silicon carbide, metal oxide varistor, a ceramic, a conductive elastomer, high dielectric constant polymer, or an alloy.

13. A loadbreak bushing comprising:

a housing including
- a first end,
- a second end opposite the first end,
- a longitudinal axis extending between the first end of the housing and the second end of the housing, and
- a bore extending along the longitudinal axis from the first end of the housing toward the second end of the housing, the bore having a first end positioned at or adjacent the first end of the housing and a second end opposite the first end of the bore;

a first electrical contact positioned within the bore adjacent the second end and configured to be in electrical communication with an electrical component, the first electrical contact configured to be physically and electrically coupled to a second electrical contact of a power connection to complete an electrical circuit;

an arc quenching member positioned within the bore between the first end of the bore and the first electrical contact, the arc quenching member including a hollow body; and a resistive member coupled to the arc quenching member, wherein the resistive member is embedded in the arc quenching member, wherein the resistive member is excluded from the circuit while the second electrical contact is physically and electrically coupled to the first electrical contact, and wherein the resistive member bridges the second electrical contact and the first electrical contact when the second electrical contact is physically and electrically decoupled from the first electrical contact thereby adding resistance to the circuit and lowering the current.

14. The loadbreak bushing of claim 13, wherein the hollow body of the arc quenching member has a first end positioned adjacent the first end of the housing and a second end opposite the first end of the hollow body and positioned adjacent the plurality of fingers of the first electrical contact, the resistive member being embedded in the second end of the hollow body.

15. The loadbreak bushing of claim 14, wherein the resistive member includes one or more resistive members that extends from the second end of the hollow body of the arc quenching member towards the first end of the hollow body of the arc quenching member.

16. The loadbreak bushing of claim 14, wherein a shape of the resistive member is substantially the same as a shape of the second end of the hollow body.

17. A loadbreak bushing comprising:

a housing including
- a first end,
- a second end opposite the first end,
- a longitudinal axis extending between the first end of the housing and the second end of the housing, and
- a bore extending along the longitudinal axis from the first end of the housing toward the second end of the housing, the bore having a first end positioned at or adjacent the first end of the housing and a second end opposite the first end of the bore;

a first electrical contact positioned within the bore adjacent the second end and configured to be in electrical communication with an electrical component, the first electrical contact configured to be physically and electrically coupled to a second electrical contact of a power connection;

an arc quenching member positioned within the bore between the first end of the bore and the first electrical contact, the arc quenching member including a hollow body; and a resistive member coupled to the arc quenching member, wherein the resistive member is a plurality of resistive member particles dispersed within a material that forms arc quenching member.

* * * * *